UNITED STATES PATENT OFFICE.

WILLIAM R. WILKINSON, OF BROOKLYN, NEW YORK.

FERTILIZER.

SPECIFICATION forming part of Letters Patent No. 290,829, dated December 25, 1883.

Application filed July 31, 1883. (No specimens.)

*To all whom it may concern:*

Be it known that I, WILLIAM R. WILKINSON, of Brooklyn, in the county of Kings and State of New York, have invented a new and Improved Tropical Fertilizer, of which the following is a full, clear, and exact description.

The object of my invention is to provide a new and improved fertilizer, which is especially adapted for use in tropical countries, or countries having a very warm climate.

The fertilizer consists of the following ingredients, mixed in the following proportions, viz: Dried blood, two hundred and fifty pounds; bone-ash, one thousand pounds; sulphate of potash, four hundred and fifty pounds; sulphate of iron, one hundred pounds; gypsum, two hundred pounds—total, two thousand pounds. The ingredients are thoroughly powdered and then mixed. The blood furnishes nitrogen and promotes growth. Bone-ash consists of charred raw bone—that is, bone in which all grease and foreign matter have been burned, leaving the bone-ash only, which retains its fertilizing properties and produces the bone phosphate in a more condensed and soluble form. Sulphate of iron gives strength and vigor to the plant, causes a healthy growth, gives a good color, and prevents pests and diseases. Gypsum decomposes all organic matter and supplies the plants with sulphates, phosphates, lime, magnesia, &c., by transmitting through the roots those particles of the soil containing rich plant food and retaining the ammonia and moisture in the soil, and absorbing the same from the atmosphere for the benefit of the plants and roots. Sulphate of potash, combined with the above ingredients, dissolves in the soil and enters the roots, and circulates rapidly in the sap, thereby greatly increasing the fruiting powers of trees and plants.

My fertilizer described above improves the soil permanently and produces exceptionally large quantities of saccharine matter.

There are great advantages in reducing the bone to bone-ash, as the grease, &c., is thereby removed from the bone, and at the same time reducing the bone to a fine powder, thus leaving the phosphates, &c., more soluble than they are if the bone is only ground, as it takes years for the soil to decompose the particles of hard bone, and in that time they are washed down so far by frequent rains that the roots cannot reach them, especially in light or sandy soil.

The above-described fertilizer is especially adapted for orange culture and all tropical fruits and vines, and will cause rapid growth, vigorous and healthy plants, increase in yield, and improvement in quality and flavor.

I am aware that each one of my ingredients has been long known to the public, but do not believe that any one has ever before mixed the five specified ingredients in the same proportion. Hence—

What I claim as new and of my invention is—

A fertilizer formed of fifty per cent. of bone-ash, ten per cent. of gypsum, five per cent. of sulphate of iron, twenty-two and one-half per cent. of sulphate of potash, and twelve and a half per cent. of dried blood, substantially as described.

WILLIAM R. WILKINSON.

Witnesses:
E. BERNHAM,
CHARLES T. CARNES.